US011433616B2

(12) United States Patent
Lauer et al.

(10) Patent No.: US 11,433,616 B2
(45) Date of Patent: Sep. 6, 2022

(54) APPARATUS FOR ADDITIVELY MANUFACTURING THREE-DIMENSIONAL OBJECTS

(71) Applicant: CONCEPT LASER GMBH, Lichtenfels (DE)

(72) Inventors: Wolfgang Lauer, Bamberg (DE); Christian Diller, Lichtenfels (DE); Viktor Engel, Coburg (DE); Andreas Ullrich, Breitengrüßbach (DE); Jens Stammberger, Rödental (DE)

(73) Assignee: CONCEPT LASER GMBH, Lichtenfels (DE)

( * ) Notice: Subject to any disclaimer, the term of this patent is extended or adjusted under 35 U.S.C. 154(b) by 211 days.

(21) Appl. No.: 16/044,402

(22) Filed: Jul. 24, 2018

(65) Prior Publication Data
US 2019/0030814 A1 Jan. 31, 2019

(30) Foreign Application Priority Data

Jul. 27, 2017 (EP) ..................................... 17183451

(51) Int. Cl.
*B29C 64/35* (2017.01)
*B29C 64/364* (2017.01)
*B29C 64/153* (2017.01)
*B29C 64/371* (2017.01)
*B22F 10/20* (2021.01)
(Continued)

(52) U.S. Cl.
CPC ............ *B29C 64/364* (2017.08); *B22F 10/20* (2021.01); *B23K 26/142* (2015.10);
(Continued)

(58) Field of Classification Search
CPC ..... B29C 64/364; B29C 64/393; B29C 64/20; B29C 64/371; B29C 64/25; B33Y 30/00;
(Continued)

(56) References Cited

U.S. PATENT DOCUMENTS 8,137,739 B2   3/2012 Philippi et al.
9,422,940 B2   8/2016 Coin
(Continued)

FOREIGN PATENT DOCUMENTS

CN    102164696 A    8/2011
CN    106346003 A    1/2017
(Continued)

OTHER PUBLICATIONS

European Search Report Corresponding to Application. No. 1718351 dated Jan. 9, 2018.
(Continued)

*Primary Examiner* — Matthew J Daniels
*Assistant Examiner* — Shibin Liang
(74) *Attorney, Agent, or Firm* — Dority & Manning, P.A.

(57) ABSTRACT

Apparatus (1) for additively manufacturing three-dimensional objects (2) by means of successive layerwise selective irradiation and consolidation of layers of a powdered build material (3) which can be consolidated by means of an energy beam (4), the apparatus (1) comprising a process chamber (8) and a stream generating device (9) configured to generate a gaseous fluid stream at least partly streaming through the process chamber (8), the gaseous fluid stream being capable of being charged with non-consolidated particulate build material, particularly smoke or smoke residues generated during operation of the apparatus (1), while streaming through the process chamber (8), wherein the stream generating (9) device comprises at least two separate stream generating units (13, 14) each being configured to generate a respective gaseous fluid stream.

13 Claims, 1 Drawing Sheet

(51) Int. Cl.
*B33Y 30/00* (2015.01)
*B33Y 40/00* (2020.01)
*B33Y 50/02* (2015.01)
*B23K 26/142* (2014.01)
*B23K 26/342* (2014.01)
*B29C 64/393* (2017.01)
*B28B 1/00* (2006.01)
*B28B 17/00* (2006.01)
*B22F 10/30* (2021.01)

(52) U.S. Cl.
CPC ............ *B23K 26/342* (2015.10); *B28B 1/001* (2013.01); *B28B 17/0081* (2013.01); *B29C 64/153* (2017.08); *B29C 64/35* (2017.08); *B29C 64/371* (2017.08); *B29C 64/393* (2017.08); *B33Y 30/00* (2014.12); *B33Y 40/00* (2014.12); *B33Y 50/02* (2014.12); *B22F 10/30* (2021.01)

(58) Field of Classification Search
CPC ....... B33Y 40/00; B33Y 50/02; B22F 3/1053; B28B 17/0081
See application file for complete search history.

(56) References Cited

U.S. PATENT DOCUMENTS

| | | | | |
|---|---|---|---|---|
| 10,166,603 | B2 * | 1/2019 | Kawada | ................ B29C 64/20 |
| 10,794,389 | B2 | 10/2020 | Grøtterud | |
| 10,974,184 | B2 | 4/2021 | Scott et al. | |
| 2011/0291331 | A1 | 12/2011 | Scott | |
| 2017/0282463 | A1 | 10/2017 | Schilling et al. | |
| 2018/0126649 | A1 * | 5/2018 | Romano | ............... B29C 64/371 |
| 2019/0030814 | A1 | 1/2019 | Lauer et al. | |

FOREIGN PATENT DOCUMENTS

| | | | | |
|---|---|---|---|---|
| CN | 106604811 | A | 4/2017 | |
| DE | 102014217786 | | 3/2016 | |
| EP | 2862651 | A1 | 4/2015 | |
| FR | 2064498 | A5 | 7/1971 | |
| JP | 2008/508129 | A | 3/2008 | |
| WO | 2014164807 | * | 3/2014 | .............. B22F 3/105 |

OTHER PUBLICATIONS

Machine Translated Japanese Office Action Corresponding to Application No. 2018012458 dated Jan. 18, 2019.
Combined Chinese Search Report and Office Action Corresponding to Application No. 201711159517 dated Mar. 26, 2020.
Wilo, "Grundlagen der Pumpentechnik", Wilo SE, Germany, 2009, 60 pages.
Sulzer-Pumpen, "Sulzer-Kreiselpumpen-Handbuch", Germany, 1997, ISBN: 9783802721762, 5 pages.
"Pumps and piping systems", Handbook of Pumps and Pumping: Pumping Manual International, Elsevier Science, United Kingdom, 2006, 4 pages.

* cited by examiner

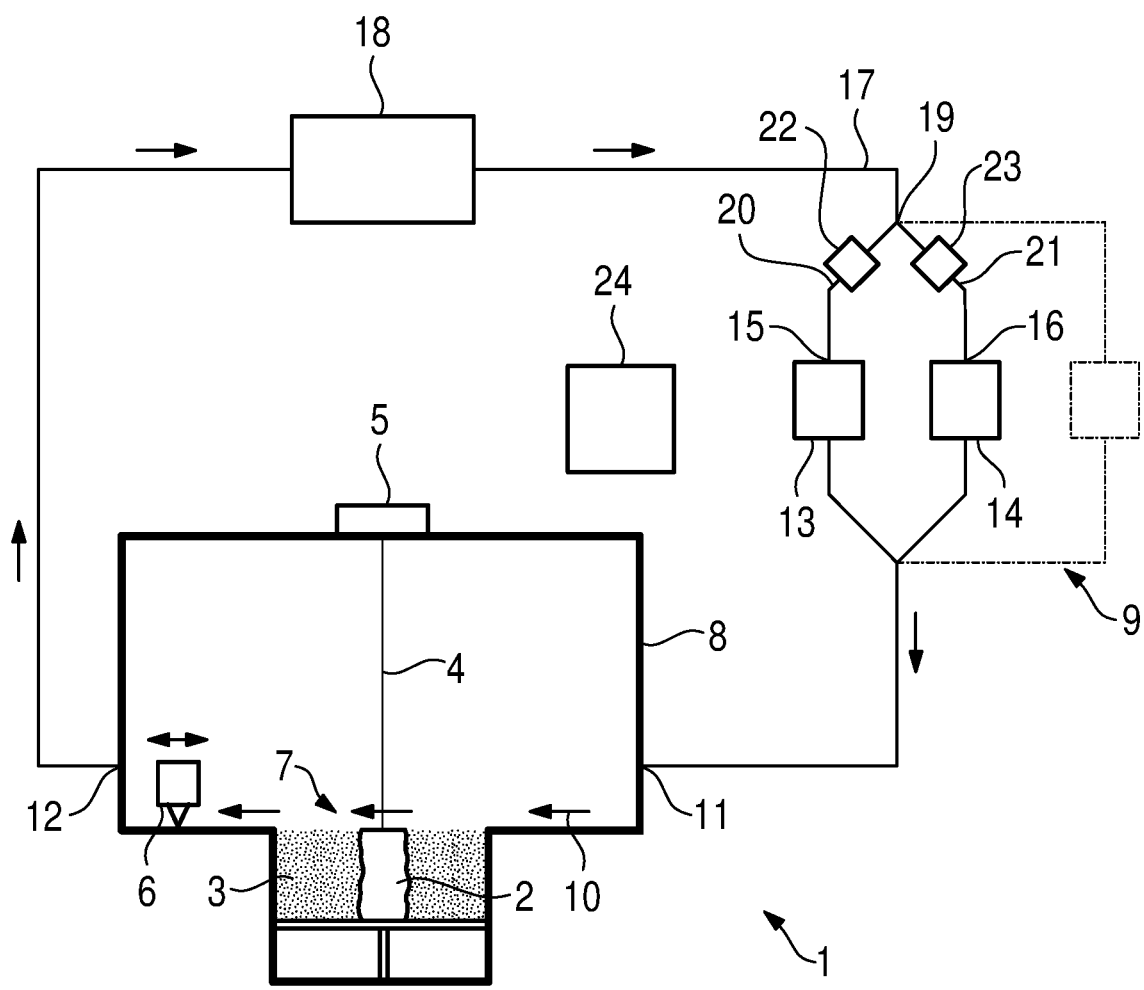

APPARATUS FOR ADDITIVELY MANUFACTURING THREE-DIMENSIONAL OBJECTS

CROSS-REFERENCE TO RELATED APPLICATIONS

This application claims priority to European Patent Application serial no. 17 183 451.8 filed Jul. 27, 2017, the contents of which is incorporated herein by reference in its entirety as if set forth verbatim.

The invention relates to an apparatus for additively manufacturing three-dimensional objects by means of successive layerwise selective irradiation and consolidation of layers of a powdered build material which can be consolidated by means of an energy beam, the apparatus comprising a process chamber and a stream generating device configured to generate a gaseous fluid stream at least partly streaming through the process chamber, the gaseous fluid stream being capable of being charged with non-consolidated particulate build material, particularly smoke or smoke residues generated during operation of the apparatus, while streaming through the process chamber.

Respective apparatuses for additively manufacturing three-dimensional objects are widely known and may be embodied as selective laser sintering apparatuses, selective laser melting apparatuses or selective electron beam melting apparatuses, for instance.

During operation of respective additive manufacturing apparatuses, an efficient removal of non-consolidated particulate build material, particularly smoke or smoke residues generated during operation of the apparatuses, without raising build material particles from the powder bed, which is a decisive factor for the quality of the object to be manufactured, can be challenging. In other words, the stream generating devices of respective apparatuses should be configured to generate a gaseous fluid stream which, while streaming through the process chamber, on the one hand efficiently removes non-consolidated build material particles from the process chamber and on the other hand avoids raising build material particles from the powder bed. This particularly, applies to additive manufacturing apparatus implementing high power energy beams, e.g. energy beams having a power of more than 200 W.

However, known stream generating devices, particularly when high power energy beams are implemented for irradiating and consolidating powdered build materials, sometimes do not fulfil the aforementioned challenges in entirely satisfactory manner.

In view of the above, it is the object of the invention provide an apparatus for additively manufacturing of three-dimensional objects having an improved stream generating device allowing for generating a gaseous fluid stream which, while streaming through the process chamber, on the one hand efficiently removes non-consolidated build material particles from the process chamber and on the other hand avoids raising build material particles from the powder bed.

This object is achieved by an apparatus for additively manufacturing three-dimensional objects according to claim 1. The claims depending on claim 1 relate to possible embodiments of the apparatus according to claim 1.

The apparatus described herein is an apparatus for additively manufacturing three-dimensional objects, e.g. technical components, by means of successive layerwise selective irradiation and consolidation of layers of a powdered build material ("build material") which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance.

The apparatus comprises a number of functional units which are used during its operation. Exemplary functional units are a process chamber, an irradiation device which is configured to selectively irradiate a build material layer disposed in the process chamber with at least one energy beam, and a stream generating device which is configured to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

Compared with stream generating devices known from prior art, the stream generating device of the additive manufacturing apparatus described herein comprises at least two separate stream generating units each being configured to generate a respective gaseous fluid stream. By comprising a plurality of stream generating units, the stream generating device fulfils the abovementioned challenge of generating a gaseous fluid stream which, while streaming through the process chamber, on the one hand efficiently removes non-consolidated build material particles from the process chamber and on the other hand avoids raising build material particles from the powder bed, in entirely satisfactory manner. The provision of a plurality of stream generating units assures that the gaseous fluid stream generated by the stream generating device efficiently removes non-consolidated build material particles from the process chamber and avoids raising build material particles from the powder bed even when implementing high power energy beams, e.g. energy beams having a power of more than 200 W, which results from the enhanceable or enhanced power spectrum of the stream generating device using at least two stream generating units compared with known stream generating devices using only a single stream generating unit.

As a result, an apparatus for additively manufacturing of three-dimensional objects having an improved stream generating device allowing for generating a gaseous fluid stream which, while streaming through the process chamber, on the one hand efficiently removes non-consolidated build material particles from the process chamber and on the other hand avoids raising build material particles from the powder bed is provided.

The at least two stream generating unit may have the same output power. Hence, the at least two stream generating units may be configured to generate a gaseous fluid stream of the same streaming properties. Particularly, the at least two stream generating units may be identical, i.e. may be of the same model or type, respectively. Using identical or at least similar stream generating units may enhance the controllability and operational stability of the stream generating device.

The at least two stream generating units are typically disposed in parallel. Thus, the at least two stream generating units may be operated in parallel. Parallel operation of the at least two stream generating units improves the streaming properties, particularly the maximum power, of the gaseous fluid stream which is or can be generated by the stream generating device.

The at least two stream generating units, i.e. a stream generating unit gas inlet, may be disposed in a streaming channel structure extending off the process chamber and hence, communicate with a respective streaming channel structure. Particularly, the streaming channel structure may extend between the process chamber, i.e. a process chamber gas outlet, a filtering device (which may form part of the apparatus) configured to filter non-consolidated particulate build material, particularly smoke or smoke residues generated during operation of the apparatus, from the gaseous fluid stream, and a process chamber gas inlet. The streaming channel structure may comprise at least one streaming channel element, such as a conduit, duct, pipe, tube, etc., through which a gaseous fluid stream may stream.

The streaming channel structure may comprise a branching section branching the streaming channel structure in at least two streaming channel branches (sub-channels). Thereby, a first stream generating unit is disposed in a first streaming channel branch (first sub-channel) and a second or further stream generating unit is disposed in a second or further streaming channel branch (second or further sub-channel). Each of the streaming channel branches may be provided with valve devices allowing for individually opening and closing each respective streaming channel branch. By the redundant provision of stream generating units and by connecting the respective stream generating units with separate streaming channel branches the failure-safety and reliability of the stream generating device is improved. In particular, in case of failure of one stream generating unit, a gaseous fluid stream can still be generated by another stream generating unit.

The apparatus may comprise a control unit assigned to the at least two stream generating units. The control unit, which may be hard- and/or software embodied, is configured to control operation of each of the at least two stream generating units independently or dependently of each other. Hence, the at least two stream generating units are configured to being operated independently or dependently of each other and may be operated independently or dependently of each other. Consequently, the gaseous fluid stream generated by the stream generating device can actually be generated by only one stream generating unit or by at least two stream generating units. In such a manner, the stream generating device is capable of generating a gaseous fluid streams in a wide range of streaming properties, e.g. streaming profiles, streaming velocities. In particular, the streaming properties of the gaseous fluid stream generated by the stream generating device can be easily adapted to diverse operational parameters, e.g. the power of the energy beams, of the apparatus. The stream generating device may therefore, be standardized for being implemented in a plurality of different apparatuses, i.e. particularly in a plurality of apparatuses 1 using different energy beam powers.

Hence, the control unit may be configured to control operation of the at least two stream generating units so as to generate a gaseous fluid stream of pre-defined streaming properties, whereby operation of each of the at least two stream generating units is controlled in such a manner that the at least two stream generating units co-act to generate the gaseous fluid stream of pre-defined streaming properties. Hence, operation of each of the at least two stream generating units may be controlled in such a manner that the sum of the power outputs of the at least two stream generating units provides the gaseous fluid stream of pre-defined streaming properties. For the exemplary case of two separate stream generating units, the effective power of the gaseous fluid stream may be halved when operating only one stream generating unit (when emanating from an operation of two stream generating units) and doubled when operating both stream generating units (when emanating from an operation of only one stream generating unit). Of course, this applies to all stream generating devices having more than two separate stream generating units in analogous manner.

Furthermore, the control unit may be configured to control operation of the at least two stream generating units in synchronized manner. Operating the at least two stream generating units in synchronized manner results in an optimized generation of the gaseous fluid stream since the fluid stream generating capabilities of the stream generating units can be used in synergetic manner.

Each of the at least two stream generating units may be a pumping device, particularly a suction pumping device, or a gas compressing device, particularly a gas compressor. Likewise, each of the at least two stream generating units may comprises at least one respective pumping device or at least one respective gas compressing device. Each of the aforementioned embodiments is capable of generating a gaseous fluid stream of desired streaming properties.

In addition to the apparatus, the invention also relates to a stream generating device for a respective apparatus. The stream generating device comprises at least two separate stream generating units each being configured to generate a gaseous fluid stream being capable of being charged with non-consolidated particulate build material, particularly smoke or smoke residues generated during operation of the apparatus, while streaming through the process chamber of a respective apparatus. All annotations concerning the apparatus apply to the stream generating device in analogous manner.

Exemplary embodiments of the invention are described with reference to the FIGURE, whereby the sole FIGURE shows a principle drawing of an apparatus for additively manufacturing three-dimensional objects according to an exemplary embodiment.

The sole FIGURE shows a principle drawing of an apparatus 1 for additively manufacturing three-dimensional objects 2, e.g. technical components, by means of successive layerwise selective irradiation and accompanying consolidation of layers of a powdered build material 3, e.g. a metal powder, which can be consolidated by means of an energy beam 4, e.g. a laser beam. The apparatus 1 can be a selective laser melting apparatus, for instance.

The apparatus 1 has a number of functional units which are used during its operation. One exemplary functional unit is an irradiation device 5, particularly an energy beam generating device and/or an energy beam deflecting device, e.g. a scanning device, which serves for selectively irradiating build material layers with at least one energy beam 4. Another exemplary functional unit is a build material application device 6, particularly a coating device, serving for applying a layer of build material 3, e.g. in a build plane 7 of a process chamber 8, of the apparatus 1. Another exemplary functional unit is a stream generating device 9 which is configured to generate a gaseous fluid stream (indicated by arrows 10) streaming through the process chamber 8, i.e. between an process chamber gas inlet 11 and a process chamber gas outlet 12, with given streaming properties, e.g. a given streaming profile, streaming velocity, etc. The gaseous fluid stream is capable of being charged with non-consolidated particulate build material, particularly smoke or smoke residues generated during operation of the apparatus 1, while streaming through the process chamber 8. The gaseous fluid stream is inert, i.e. a stream of an inert gas, e.g. argon, nitrogen, carbon dioxide, etc.

The stream generating device 9 comprises a plurality of, i.e. in the exemplary embodiment two, separate stream generating units 13, 14 each being configured to generate a respective gaseous fluid stream. By comprising a plurality of stream generating units 13, 14, the stream generating device 9 allows for generating a gaseous fluid stream which, while streaming through the process chamber 8, on the one hand efficiently removes non-consolidated build material particles from the process chamber 8 and on the other hand avoids raising build material particles from the powder bed, in entirely satisfactory manner. The provision of a plurality of stream generating units 13, 14 assures that the gaseous fluid stream efficiently removes non-consolidated build material particles from the process chamber 8 and avoids raising build material particles from the powder bed even when implementing high power energy beams, e.g. energy beams having a power of more than 200 W, which results from the enhanced power spectrum of the stream generating device 9 using a plurality of stream generating units 13, 14 compared with known stream generating devices using only a single stream generating unit.

Each of the stream generating units 13, 14 may be a pumping device, particularly a suction pumping device, or a gas compressing device, particularly a gas compressor.

The stream generating units 13, 14 may have the same output power. Hence, the stream generating units 13, 14 may be configured to generate a gaseous fluid stream of the same streaming properties. The two stream generating units 13, 14 may be identical, i.e. may be of the same model or type, respectively.

As is discernible from the FIGURE, the stream generating units 13, 14 are disposed in parallel. Thus, the two stream generating units 13, 14 may be operated in parallel.

The stream generating units 13, 14, i.e. respective stream generating unit gas inlets 15, 16, are disposed in a streaming channel structure 17. The streaming channel structure 17 comprises a number of streaming channel elements (not explicitly denoted), such as conduits, ducts, pipes, tubes, etc., through which the gaseous fluid stream may stream and extends off the process chamber 8, particularly process chamber gas outlet 12, respectively of the process chamber 8. As is clear from the FIGURE, the streaming channel structure 17 extends between the process chamber gas outlet 12 and the process chamber gas inlet 11 so that the gaseous fluid stream may stream in a circle.

As is also clear from the FIGURE, a filtering device 18 configured to filter non-consolidated particulate build material, particularly smoke or smoke residues generated during operation of the apparatus 1, from the gaseous fluid stream is disposed in the streaming channel structure 17 between the process gas outlet 12 of the process chamber 8 and the stream generating device 9.

As is also clear from the FIGURE, the streaming channel structure 17 comprises a branching section 19 branching the streaming channel structure 17 in two streaming channel branches 20, 21 (sub-channels). Thereby, a first stream generating unit 13 is disposed in a first streaming channel branch 20 (first sub-channel) and a second stream generating unit 14 is disposed in a second streaming channel branch 21 (second sub-channel). Each of the streaming channel branches 20, 21 may be provided with valve devices 22, 23 allowing for individually opening and closing each respective streaming channel branch 20, 21.

The apparatus 1 comprises a control unit 24 assigned to the stream generating units 13, 14. The control unit 24, which may be hard- and/or software embodied, is configured to control operation of each of the stream generating units 13, 14 independently or dependently of each other. Hence, the stream generating units 13, 14 are configured to being operated independently or dependently of each other and may be operated independently or dependently of each other. Consequently, the gaseous fluid stream generated by the stream generating device 9 can actually be generated by only one stream generating unit 13, 14 or by two stream generating units 13, 14. In such a manner, the stream generating device 9 is capable of generating gaseous fluid streams in a wide range of streaming properties, e.g. streaming profiles, streaming velocities, etc. In particular, the streaming properties of the gaseous fluid stream generated by the stream generating device 9 can be easily adapted to diverse operational parameters, e.g. the power of the energy beams, of the apparatus 1. The stream generating device 9 may therefore, be standardized for being implemented in a plurality of different apparatuses 1.

Hence, the control unit 24 may be configured to control operation of the stream generating units 13, 14 so as to generate a gaseous fluid stream of pre-defined streaming properties, whereby operation of each of the stream generating units 13, 14 is controlled in such a manner that the stream generating units 13, 14 co-act to generate the gaseous fluid stream of pre-defined streaming properties. Hence, operation of each of the stream generating units 13, 14 may be controlled in such a manner that the sum of the power outputs of the stream generating units 13, 14 provides the gaseous fluid stream of pre-defined streaming properties. For the exemplary embodiment according to the FIGURE, the effective power of the gaseous fluid stream may be halved when operating only one stream generating unit 13, 14 (when emanating from an operation of two stream generating units 13, 14) and doubled when operating both stream generating units 13, 14 (when emanating from an operation of only one stream generating unit 13, 14).

The control unit 24 may be configured to control operation of the stream generating units 13, 14 in synchronized manner. Operating the stream generating units 13, 14 in synchronized manner results in an optimized generation of the gaseous fluid stream since the fluid stream generating capabilities of the stream generating units 13, 14 can be used in synergetic manner.

The invention claimed is:

1. An apparatus for additively manufacturing three-dimensional objects through successive layerwise selective irradiation and consolidation of layers of a powdered build material which can be consolidated by means of an energy beam, the apparatus comprising:
    a process chamber;
    a stream generating device configured to generate a gaseous fluid stream at least partly streaming through the process chamber, the gaseous fluid stream adapted to remove a non-consolidated particulate build material while streaming through the process chamber, wherein the stream generating device comprises:
        a first stream generating unit comprising a first pumping device; and
        a second stream generating unit comprising a second pumping device, wherein the second stream generating unit and the first stream generating unit are disposed in parallel and are configured to co-act to generate the gaseous fluid stream;

wherein the first and second stream generating units are disposed in a streaming channel structure extending off the process chamber and wherein the streaming channel structure comprises a branching section branching the streaming channel structure in at least two streaming channel branches, whereby the first stream generating unit is disposed in a first streaming channel branch and the second stream generating unit is disposed in a second streaming channel branch; and a filtering device disposed in between the process chamber and the stream generating device.

2. The apparatus according to claim 1, wherein each of the first and second stream generating units is a suction pumping device or comprises at least one suction pumping device.

3. The apparatus according to claim 1, wherein the first and second stream generating units are operated in parallel.

4. The apparatus according to claim 1, wherein the streaming channel structure extends between a process chamber gas outlet and a process chamber gas inlet, wherein the filtering device is configured to filter the non-consolidated particulate build matter from the gaseous fluid stream, the filtering device disposed between the process chamber gas outlet and the process chamber gas inlet along the streaming channel structure.

5. The apparatus according to claim 1, wherein the first and second stream generating units have the same output power.

6. The apparatus according to claim 1, further comprising a control unit assigned to the first and second stream generating units, wherein the control unit is configured to control operation of at least one of the first and second stream generating units dependent on the other of the first and second stream generating units.

7. The apparatus according to claim 1, further comprising a control unit assigned to the first and second stream generating units, the control unit being configured to control operation of each the first and second stream generating units independently of each other.

8. The apparatus according to claim 7, wherein the control unit is further configured to control operation of the first and second stream generating units in synchronized manner.

9. The apparatus according to claim 8, wherein the control unit is configured to control operation of first and second stream generating units so as to generate a gaseous fluid stream of pre-defined streaming properties, whereby operation of each of the first and second stream generating units is controlled in such a manner that the first and second stream generating units co-act to generate the gaseous fluid stream of pre-defined streaming properties.

10. A stream generating device for an apparatus for additively manufacturing three-dimensional objects through successive layerwise selective irradiation and consolidation of layers of a powdered build material which can be consolidated by means of an energy beam in a process chamber, the stream generating device comprising:

a first stream generating unit comprising a first pumping device configured to generate a first gaseous fluid stream at least partly streaming through the process chamber; and a second stream generating unit comprising a second pumping device configured to generate a second gaseous fluid stream at least partly streaming through the process chamber, wherein the second stream generating unit and the first stream generating unit are disposed in parallel, and wherein the first and second gaseous fluid streams are adapted to co-act to remove a non-consolidated particulate build material while streaming through the process chamber;

wherein the first and second stream generating units are disposed in a streaming channel structure extending off the process chamber and wherein the streaming channel structure comprises a branching section branching the streaming channel structure in at least two streaming channel branches, whereby the first stream generating unit is disposed in a first streaming channel branch and the second stream generating unit is disposed in a second streaming channel branch, and wherein a filtering device disposed in between the process chamber and the stream generating device.

11. The stream generating device according to claim 10, further comprising a control unit assigned to the first and second stream generating units, wherein the control unit is configured to control operation of at least one of the first and second stream generating units dependent on the other of the first and second stream generating units.

12. The stream generating device according to claim 10, further comprising a control unit assigned to the first and second stream generating units, wherein the control unit is configured to control operation of the first and second stream generating units independently of each other.

13. The stream generating device according to claim 12, wherein the control unit is further configured to control operation of the first and second stream generating units in synchronized manner.

* * * * *